United States Patent [19]

Wehrmann et al.

[11] Patent Number: 4,565,592
[45] Date of Patent: Jan. 21, 1986

[54] AUTOMATED MANUFACTURING MONITORING

[75] Inventors: Rick Wehrmann, Twinsburg; Robert Haby, Stow, both of Ohio

[73] Assignee: Automated Packaging Systems, Inc., Twinsburg, Ohio

[21] Appl. No.: 626,731

[22] Filed: Jul. 2, 1984

[51] Int. Cl.[4] .............................................. B65H 23/18
[52] U.S. Cl. ........................................ 156/64; 53/64; 156/350; 156/361
[58] Field of Search .................. 53/51, 64, 505, 66, 53/297; 226/2, 27–32, 43, 34; 156/361, 353, 350

[56] References Cited

U.S. PATENT DOCUMENTS

3,583,128  6/1971  Johnson ........................... 226/28 X
4,316,566  2/1982  Avleth ............................. 226/28 X
4,412,876  11/1983  Levner ............................. 156/64

Primary Examiner—David Simmons
Attorney, Agent, or Firm—Watts, Hoffmann, Fisher & Heinke Co.

[57] ABSTRACT

Improved method and apparatus for applying a series of labels to a corresponding sequence of containers. Operation of a label applying apparatus is automatically monitored and corrections made to that operation based upon apparatus performance. More particularly, after an endmost label is severed from a web of like labels, the position of the end of the web is sensed and the web end repositioned in anticipation of the next label applying stage. More accurate labeling is achieved without disrupting the speed with which labels are applied.

23 Claims, 13 Drawing Figures

AUTOMATED MANUFACTURING MONITORING

DESCRIPTION

1. Technical Field

The present invention relates to method and apparatus for precisely controlling a manufacturing process and in particular relates to an improved bottle labeler where individual plastic labels are affixed to bottles, cans and the like.

2. Background Art

Automated equipment has enhanced the reliability and speed of many manufacturing processes. Robots have replaced humans in performing backbreaking as well as intricate, detailed work. The accuracy with which work operations can be performed has increased as the reliability and sensitivity of tactile, acoustic, and electromagnetic sensors used by these robots has increased.

The packaging and labeling art is one area particularly suited to automation. The process of affixing similiar labels to a sequence of objects as fast as possible can be accomplished automatically without a human handling either the label or the object. A reliable and commercially successful bottle labeling machine for automatically affixing plastic labels to bottles, cans and the like is disclosed in U.S. Pat. No. 4,412,876 to Lerner et al which issued on Nov. 1, 1983 and is incorporated herein by reference.

The apparatus disclosed in the '876 patent automatically applies tubular sleeve-like labels to a series of containers one after the other. In the disclosed apparatus, these containers are automatically moved, in turn, to a bottling station where the label machine stretches an endmost of a series or chain of sleeves, then automatically moves the stretched label over the container at the same time tearing the stretched label away from the chain.

The '876 apparatus has particular utility in the bottling industry where multi-colored, unique label designs are used to obtain market recognition of a particular brand. As the apparatus moves bottles or cans through a labeling station at a rate of one a second, it senses movement of the bottles or cans and accurately affixes the sleeve type labels.

To aid in performing these steps, a preferred embodiment of the apparatus in the '876 patent utilizes a chain of sleeves having invisible indicia marked on the surface of the labels. These indicia do not disrupt the attractive appearance of the labels yet enable coordination of the movement of the sleeve at the vicinity of the labeling work station.

The apparatus also includes a gripper which grasps each label after it has been stretched over a cylindrical mandrel. The stretched label is moved over its associated container while a sensor monitors movement of the label chain to sense the arrival of the next sleeve over the mandrel. This next sleeve is separated from the previous sleeve by a brake which pins the subsequent label against the mandrel. The gripper continues in a cyclical manner, returning to the clamp station where the next succeeding label is grasped and moved over the next container.

If the label is accurately sensed by the sensor, the accuracy with which the label is applied depends upon the precision with which the brake can clamp the next succeeding label against the mandrel and separate that label from its predecessor. The plastic can stretch in unexpected or a non-uniform manner. Continuous high speed operation of the brake mechanism over time can also cause non-uniform placement of the sleeve over the mandrel. Variations in label positioning on the mandrel affect the accuracy with which the gripper slides the label over a bottle or can. This inaccuracy affects the visual appearance the labeled can or bottle presents to the consumer and in the highly competitive bottling industry such inaccuracies are unacceptable. Large mis-registrations of the label on the container can result in label mis-feeds and inefficiencies caused by the necessity of recalibrating the labeling apparatus.

DISCLOSURE OF INVENTION

The present invention monitors automated work operations and fine tunes those operations to increase the accuracy with which they are performed. The invention can enhance an automated work operation which includes a number of processing steps that are repetitively performed on a series of like objects. In accordance with the invention each of the objects is moved to a workstation where an operation is to be performed. A first operation is performed on the object and the performance of this first operation is monitored in anticipation of a second or subsequent operation. Between performance of the first and second operations the position of the object is adjusted based upon this monitoring step.

The application of a series of sleeve-like labels to bottles or cans at a labeling station illustrates one use of the invention. A first label is separated from its predecessor so that it can be placed about a container at the labeling station. Performance of this separation is monitored to insure the next succeeding label is properly positioned. As the predecessor label is being affixed about the bottle or can, the position of the subsequent label can be adjusted so that when this succeeding label is separated from the chain of sleeves, it is accurately positioned about its associated bottle or can.

To accomplish this monitoring and repositioning in a bottle labeling environment, the '876 apparatus is modified so that the mandrel which stretches succeeding labels in anticipation of application about a bottle or can is movable with respect to the remaining '876 apparatus. More particularly, the mandrel can be raised or lowered to reposition the label as its preceeding label is being placed about a bottle or can.

To more fully appreciate the invention, operation of the '876 apparatus is examined. The label is first stretched then separated from its succeeding label as it is pulled by a pair of clamps or grippers to the labeling station. The separation is achieved by a brake which pins the succeeding label against the mandrel in a stretched position. Practice of the present invention includes apparatus for monitoring the relative position between the end of the next or succeeding label and the labeling station. This relative positioning is important since if the grippers grasp the succeeding label either too high or too low the clamp movement will mis-position the label about the bottle or can.

In a preferred embodiment, an optical sensor senses the position of an interface between the mandrel and the next succeeding stretched label. Depending upon this sensed position, the mandrel is either raised or lowered by actuating a stepper motor coupled to the mandrel. The direction and amount of stepper motor actuation is controlled by control circuitry coupled to the sensor.

The mandrel and stepper motor are connected through a parallelogram linkage which raises and lowers the mandrel along a substantially vertical path.

The circuitry for actuating the stepper motor incorporates a micro-processor which responds to optical signals generated at the mandrel/sleeve interface. The micro-processor also monitors signals generated in response to movement of the clamped sleeve toward the bottling station. This micro-processor is therefore capable of not only actuating the stepper motor, but also controlling operation of the brake which separates each label from the chain.

A Hall effect transducer having a sensor mounted to the mandrel carriage and two magnets fixed in relation to the labeling apparatus senses when the mandrel has been driven to an extreme end of travel by the stepper motor. If the end of travel is reached, the readjustment is terminated, even though the optimum position may not have yet been reached. If the micro-processor continues to readjust the mandrel position each label cycle it should correct such a situation with time and only one or two labels will be slightly mispositioned on their associated bottle or can.

From the above it should be appreciated that one object of the invention is a fine tuning or readjustment of the position of one of a series of a objects on which work operations are to be performed and a particular object of the invention is to improve the performance of a bottle labeling apparatus. Other objects, advantages and features of the invention will become better understood when a detailed description of a preferred embodiment of the invention is described in conjunction with the accompanying drawings.

DETAILED DESCRIPTION OF A PREFERRED EMBODIMENT

Figure 1:
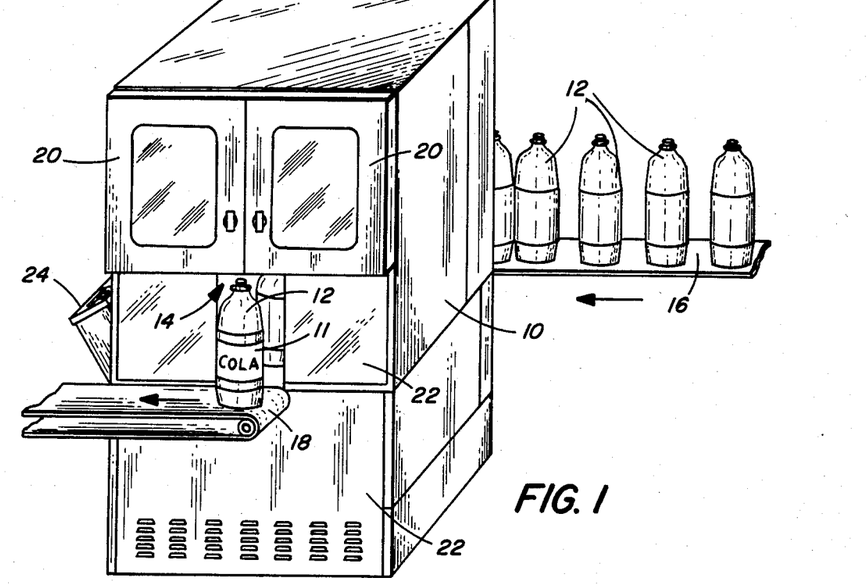
FIG. 1 is a perspective view of a bottle labeling apparatus.

Turning now to the drawings, FIG. 1 illustrates labeling apparatus 10 for affixing labels 11 on a series of containers 12 which are fed along a through passage 14 in the labeling apparatus. A feed conveyor 16 and delivery conveyor 18 deliver the containers 12 to and from the through passage 14.

The labeling apparatus 10 accepts each container 12 in turn, and automatically applies a label 11 to that container at a rate of at least one every second. For clarity in illustration, mechanisms for moving the labels through the through passage 14 are not illustrated but it should be appreciated that the apparatus 10 must include a mechanism for pushing the containers 12 from the feed conveyor at a controlled pace in coordination with activation of the labeling apparatus.

Hinged doors 20 and removable control panels 22 allow access to a labeling station 30 for adjusting or maintenance of the apparatus. An operator control panel 24 includes various switches to allow inputs to be entered for controlling operation of the labeling apparatus 10.

Figure 2:
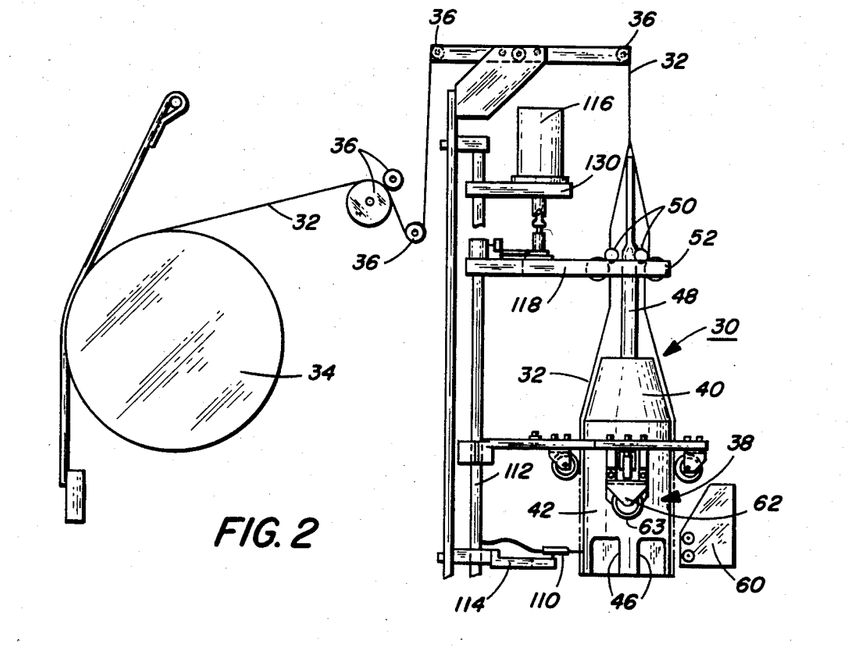
FIG. 2 is a side elevation view of a portion of the FIG. 1 apparatus with a cover removed.
Figure 3:
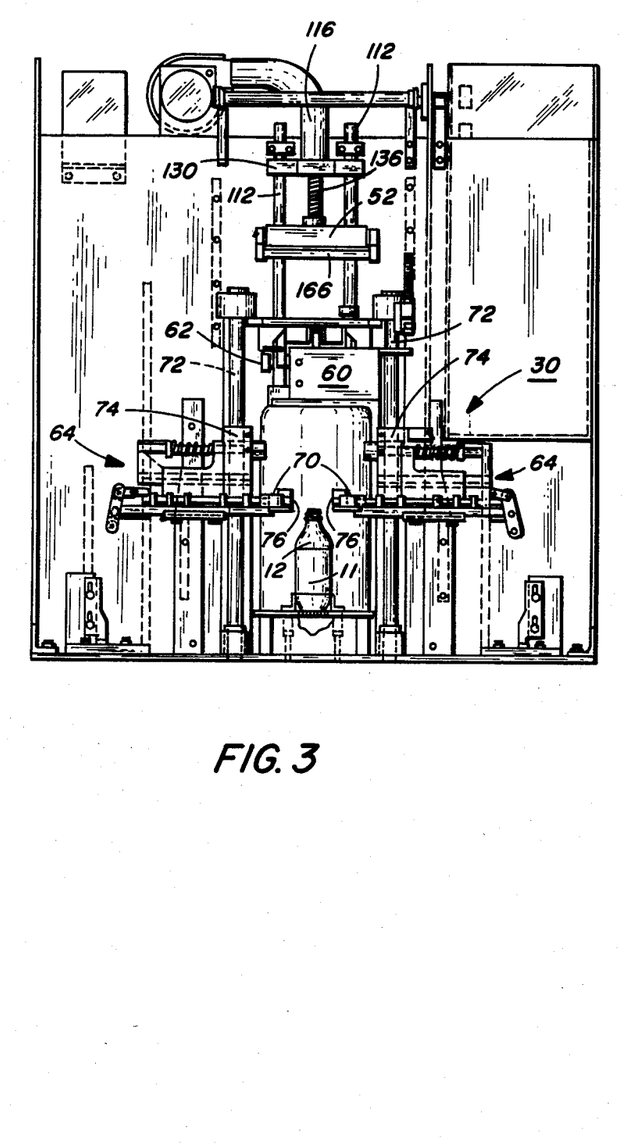
FIG. 3 is a front elevation view of the bottle labeling apparatus of FIG. 2.

FIGS. 2 and 3 illustrate the labeling station 30 where a sequence or chain of labels in the form of a tubular web 32 are applied to individual containers. In FIG. 2 the web 32 is shown schematically being unwound from a supply 34 around a series of pulleys 36 and over a movable mandrel 38. The mandrel 38 expands the labels prior to separation of an endmost label from the web 32.

The mandrel 38 extends inside the tubular web 32 and the web is expanded as it passes over the mandrel. The mandrel 38 is formed of tubular sheet metal or plastic having a frusto conical section 40 at its upper end and a generally cylindrical skirt 42 forming its lower end. The skirt defines a pair of cut-outs 46 on its lateral sides for enabling a label stretched about the base of the skirt to be gripped and pulled downwardly relative to the mandrel.

A supporting tongue 48 extends upwardly from the mandrel 38 and carries rollers 50 which coact with a mandrel support 52. The label web 32 passes over the rollers 50 and then the mandrel 38.

A web position detector 60 senses indicia on each successive label. When that label is properly positioned with respect to the mandrel 38 the detector 60 produces a web brake operating signal for activating a solenoid actuated brake 62. The web position indicia are accurately located on each label and the detector 60 and mandrel 38 are positioned so that the each indicium is sensed as it moves over the mandrel 38.

A preferred detector 60 detects visible light fluorescing from the invisible indicia on each label and is constructed as disclosed in U.S. Pat. No. 4,392,056 to Weyandt entitled "Control Marking Detector" which issued July 5, 1983 and is incorporated herein by reference. The position of the detector 60 relative to the mandrel 38 can be adjusted by a support assembly (not shown) so that it can be moved both vertically and side-to-side.

A gripper assembly 64 (FIG. 3) grips a label positioned about the mandrel 38 and pulls the label down over a container 12 positioned directly beneath the mandrel 38. The gripper assembly 64 releases the label when it is properly positioned on the container and then is driven upwardly to grasp the next label and repeat the labeling cycle. As the gripper assembly 64 moves an endmost label with respect to the mandrel 38, the detector 60 senses the arrival of the next succeeding label and activates the brake 62.

Two brake pads 63 (FIG. 2) are driven into engagement with the web to pin the web against the mandrel 38. The force of engagement between the brake and the web prevents the web from moving relative to the mandrel. As continued movement of the gripper assembly 64 moves the endmost label away from the mandrel 38, a line of weakness (not shown) around the sleeve gives way and the endmost label is severed from the web. When the web is thus severed, the label which the web brake 62 is engaged is positioned with its newly severed lower edge aligned with the bottom of the mandrel 38. The brake 62 is energized only momentarily but long enough to assure separation of the endmost label from the web. The brake 62 is de-energized to free the label and allow the gripper assembly 64 to again move upwardly and grasp the next label for application to a next container.

The label gripper assembly 64 comprises a pair of gripper jaw mechanisms 70 each supported on a respective one of two support shafts 72 by a gripper support assembly 74. Each gripper jaw mechanism includes a movable jaw 76 with a curved inner face and a fixed jaw which has a curvature to match the movable jaw.

The label gripper assembly 64 moves up and down along the support shafts 72 to grab successive labels by clamping the movable jaw 76 against the fixed jaw and delivering a stretched label over a bottle. As the label is slipped over the bottle the gripper jaws keep the label stretched until the movable jaw is deactivated with the label in place.

The description of the labeling apparatus 10 has thus far been substantially similiar to the description in U.S. Pat. No. 4,412,876 to Lerner et al. Additional details regarding the construction, arrangement or operation of the brake 62, gripper assembly 64 and mandrel 38 can be obtained by reference to this aforementioned and incorporated patent.

In the present invention, a second detector 110 (FIG. 2) monitors labeling at the label applying station 30 to insure each label 11 is accurately positioned about an associated container 12. The second detector 110 is shown mounted to a support shaft 112 by an arm 114. The vertical position of the arm 114 is adjustable so that the second detector 110 can be relatively positioned with respect to the mandrel 38.

This adjustment allows a fiber optic input or "eye" to be positioned up or down in relation to the mandrel. The second detector 110 helps assure a distance between the bottom of a endmost label and a desired bottom position of that label on the container is maintained. Stretching of the plastic and/or non-uniform operation of the brake 62 can result in this distance changing. Since the stroke or distance of gripper movement is constant, changes in this distance result in the label being misapplied.

The second detector 110 acts as a safeguard against this happening by helping adjust the bottom position of each label after the brake 62 pins that label against the mandrel. During the time in which the gripper assembly 64 is affixing a stretched label about a container 12, a stepper motor 116 coupled to the mandrel 38 by a movable linkage 118 raises or lowers the mandrel to correct this position.

Figures 4, 5:
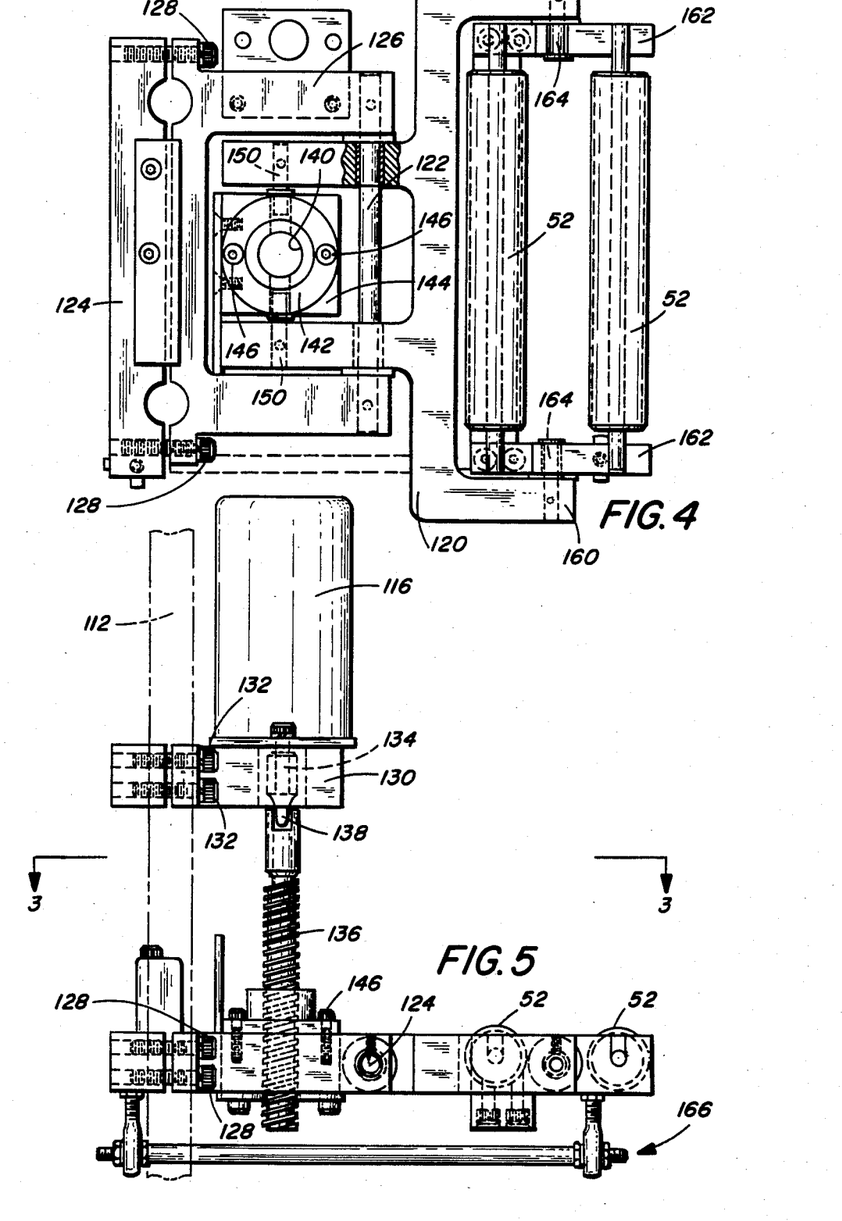
FIG. 4 is a top plan view showing a pivoted carriage for mounting a movable mandrel.
FIG. 5 is an elevation view showing details of a drive for the FIG. 3 pivoting carriage.

A detailed description of this linkage is shown in FIGS. 4 and 5. The linkage 118 includes a yoke 120 pivotally supported by a rod 122 defining a pivoting axis 123. The rod 122 is pinned to a support carriage 126 mounted to two support shafts 112. The vertical position of the carriage 126 can be adjusted by loosening two threaded connectors 128 which fix the carriage 126 to the shafts 112.

The stepper motor 116 is also coupled to the shafts 112 by a support 130 and suitable threaded connectors 132. A stepper motor output shaft 134 is connected to a threaded drive shaft 136 by a universal joint 138. The threaded drive shaft 136 engages a threaded through passage 140 in a circular collar 142 positioned on a mounting block 144 by threaded connectors 146. This mounting block 144 is pivotally connected to the yoke 120 by two mounting pins 150. Raising and lowering the shaft 136 causes upward and downward movement of the mounting block 144 and in turn causes the yoke 120 to pivot about the pivot axis 124. Pivotally supported between two arms 160 of the yoke 120 are two generally horizontal cross arms 162. As the output shaft 134 drives the block 144 in a downward position, pivoting action of the yoke 120 causes these two arms 162 to lift upward.

The two cross arms 162 are pivotally connected by supporting pins 164 and are maintained in a horizontal or generally horizontal orientation by a parallelogram linkage 166. As the arms 162 are raised and lowered in response to stepper motor actuation, the two rollers 52 remain in a generally horizontal plane. As they are driven up and down in response to the stepper motor, the mandrel position is readjusted until the sensor 110 senses that it has been properly repositioned in anticipation of the next labeling cycle whereby the gripper assembly tears off the next succeeding label.

Figure 6:
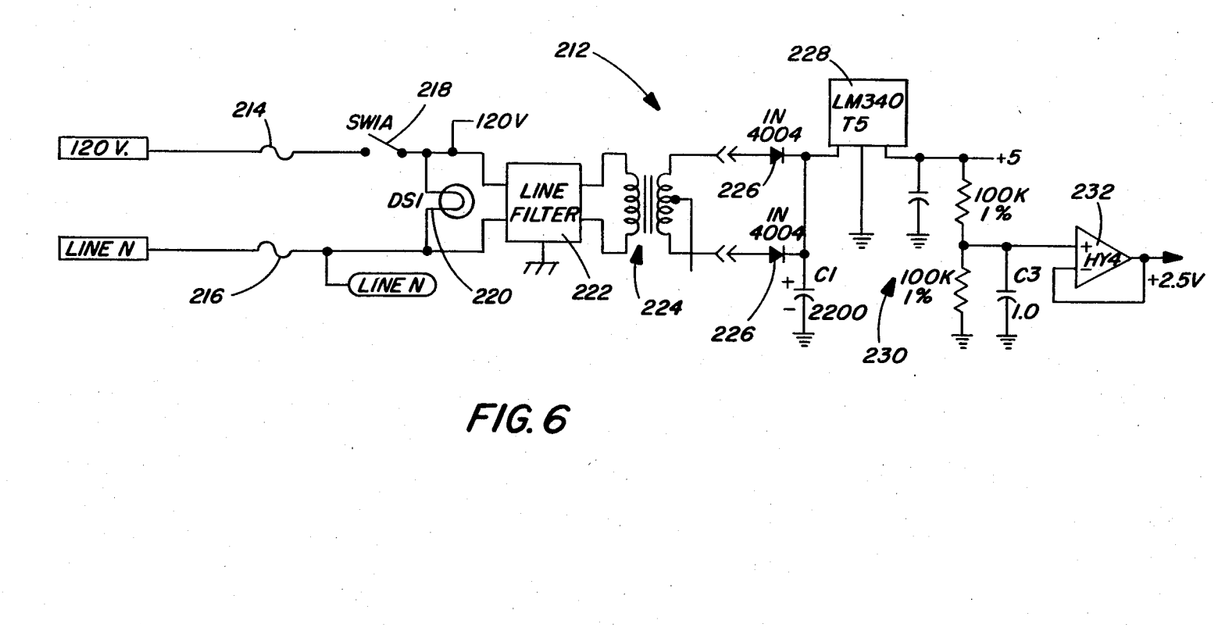
FIG. 6 shows a power supply for powering circuitry used in the present invention.

The stepper motor 116 and two sensors or detectors 60, 110 are coupled to circuitry (FIGS. 6–10) for coordinating stepper motor energization with the labeling cycle. The circuitry includes a programmable controller 210 which in a preferred embodiment comprises a RCA 1802 micro-processor. A power supply circuit 212 (FIG. 6) generates direct current signals of +5 and 2.5 volts for transmittal to other portions of the labeling apparatus circuitry. The power circuit 212 is coupled to a 120 volt A.C. source through a pair of fuses 214, 216 and a switch 218. When the switch 218 is closed, a light emitting diode 220 indicates this fact as the 120 volt A.C. signal is coupled across the diode. A line filter 222 couples the alternating current signal to a transformer 224 having a secondary coupled to two diodes 226 having their cathodes tied together and coupled to a voltage regulator 228. The voltage regulator generates the 5 volt output which is used in energizing the controller 210 as well as a reference voltage throughout the circuit. Thus, whenever the symbol +5 is used in the remaining circuitry, this voltage is supplied by the circuit 212. A voltage divider 230 cuts this 5 volt signal to 2.5 volts. The output from the voltage divider 230 is coupled to a buffer amplifier 232 whose output is a 2.5 volt reference signal.

The remaining labeling apparatus circuitry is divided into portions in FIGS. 7–10 and the connection of these various portions to the micro-processor 210 is illustrated in each of those figures. A first portion shown in FIG. 7A has an input 242 from the invisible indicia mark detector 60. This input 242 is coupled to a comparator amplifier 244 having a 2.5 reference input. The amplifier 244 acts as an inverter so than when the input 242 is greater than 2.5 volts, the amplifier output is low. This signal is coupled to pin EF3 on the microprocessor 210.

Figures 7A, 7B:
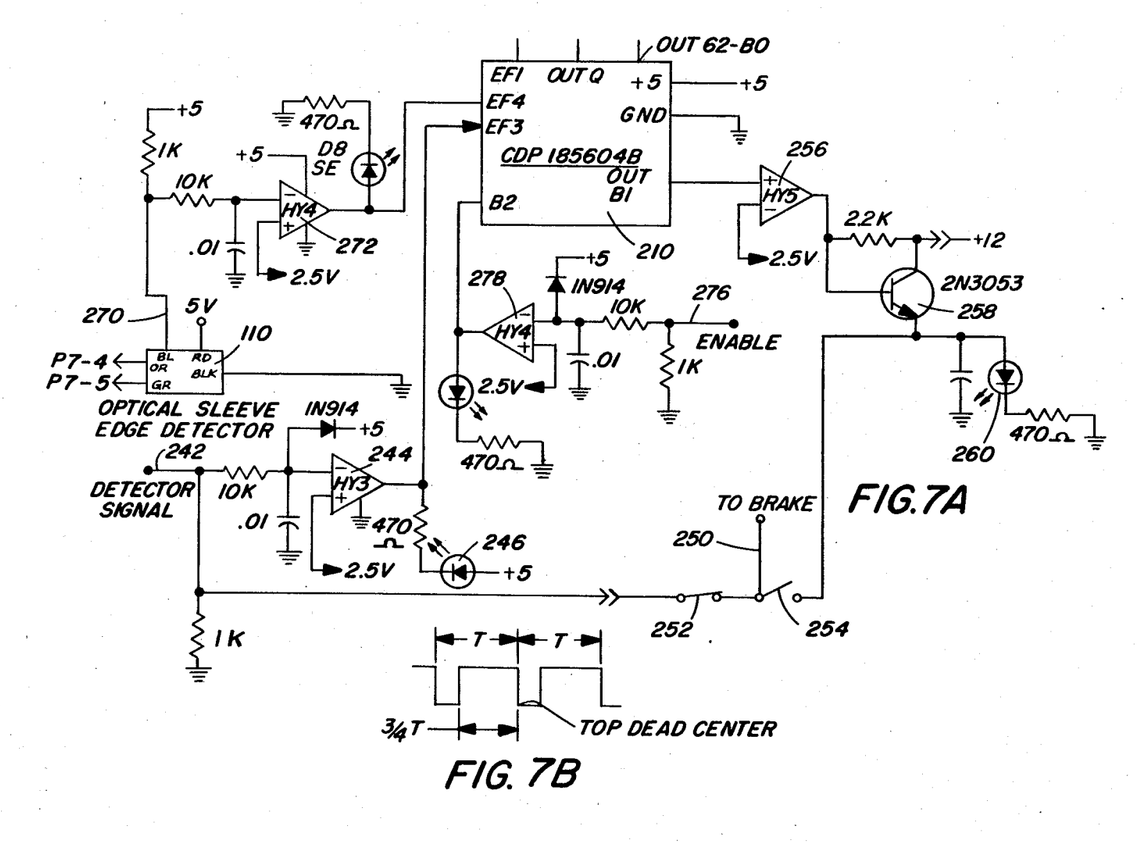
FIGS. 7-10 show various components of circuitry for practicing the invention.

FIG. 7B illustrates a timing diagram showing the output from the detector 60. The detector output is forced low when the detector 60 is blinded at top dead center of the gripper assembly movement. This is the point at which the gripper assembly grasps the endmost label and begins moving it down toward the container to which it is to affixed.

At top dead center the detector 60 is intentionally blinded so that it does not falsely sense noise from the solenoid activated gripper assembly. The detector is again activated after about one eighth cycle so it can sense the arrival of a mark on the web 32.

After approximately one quarter of a cycle, the detector 60 goes high in response to the sensing of a mark on the next subsequent label. This is the point in time in which the brake must be activated to separate the label grasp by the label applying assembly from the remaining labels in the web. The high signal from the detector 60 (FIG. 7B) causes the amplifier 244 to transmit a low signal to pin EF3 on the micro-processor controller 210. A light emitting diode 246 gives a visual indication that the detector output has gone high.

The FIG. 7 circuit portion also includes a brake output 250 to activate the brake, causing it to pin the next label against the mandrel thereby severing that label from its predecessor. Two switches, 252, 254 are coupled to this brake output and the state of these two switches dictates how the brake signal is generated. The first switch 252 is a normally closed contact of a relay (not shown) energized by the power supply on/off switch 218. With the switch 218 open the micro-processor 210 is not receiving power and yet the labeling assembly 10 can operate without the control procedures supplied by that micro-processor. Under these circumstances, the brake signal 250 is coupled to the output 242 from the detector 60. Thus, when the detector 242 senses the indicium on a label, the brake is automatically activated without micro-processor input.

When the power switch 218 is closed, however, the activation of the brake signal 250 is caused by the micro-processor. Contact 254 now closes and contact 252 opens so that the brake output 250 comes from micro-processor output pin B1. The micro-processor algorithm (to be described) causes a high output at pin B1 which is coupled to a comparator 256. This high output turns on a NPN transistor 258 (one shot) which is coupled to the now closed switch 254 to the brake output 250. A visual indication from a light emitting diode 260 also indicates a brake signal has been generated by the micro-processor 210.

The detector 110 is shown schematically forming a portion of the FIG. 7A circuit. This detector 110 has an output 270 coupled through a comparator 272 to micro-processor input pin EF4. The output 270 goes high when the detector 110 sees a light reflection off the mandrel surface indicating that the edge or bottom most portion of the next succeeding sleeve is higher than the referenced point of the detector 110. A low or zero volt output occurs when the detector 110 sees no reflection and therefore gives an indication when the bottom edge of the next sleeve is lower than the detector position.

One final element of the FIG. 7A circuit generates a timing signal for the micro-processor 210. An enable input 276 is coupled through a comparator 278 to pin B2 on the micro-processor 210. This enable input goes low when the label applying apparatus reaches top dead center in its labeling cycle. This enable signal is used by the micro-processor algorithm and is generated in response to gripper assembly movement by circuitry not shown, but is preferably generated by a limit switch closed at the top dead center of gripper movement.

Figure 8:
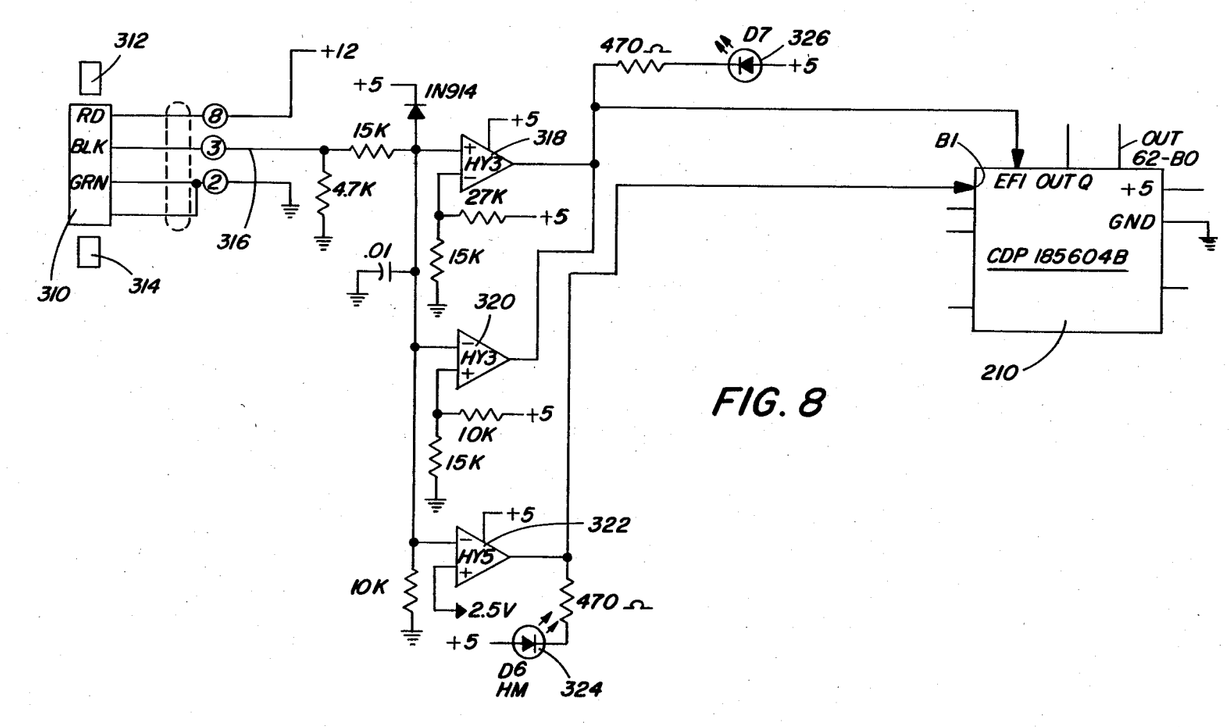

Turning now to FIG. 8, the operation of a Hall effect sensor 310 is described. The sensor 310 is mounted to the yoke 120 and moves up and down in response in stepper motor energization. Fixed to the carriage 126 are two magnets 312, 314 which provide end of travel limit sensing. Then sensor 310 senses the magnets 312, 314 and signals the micro-processor controller 210 when an end of travel has been reached. An output 316 from the transducer 310 is coupled to three operational amplifiers 318, 320, 322. Outputs from two of operational amplifiers 318, 322 are coupled together and are in turn coupled to input pin EF1 on the controller 210. An output of the third operational amplifier 322 is coupled to input pin B1 of the controller 210.

The status of these two input pins on the micro-processor controller 210 determine whether the mandrel support rollers 52 support the mandrel 38 above or below a center position. The inputs also determine whether the carriage has reached either of its limits of travel. The controller 210 monitors input pin B1 to sense a change of state. When this input changes, the controller 210 knows the carriage is at its home position. The inputs on pin EF1 are either high, in which case the carriage has not reached either of its limits of travel, or low in which case one of the two limits has been reached. In the event input EF1 goes low, a determination is made by the controller 210 as to which limit of travel has been reached depending upon the status of input B1. If the change at pin B1 occurs in a particular sense and subsequent to that change, a limit of travel is reached, the controller 210 can determine which limit has been encountered. Two light emitting diodes 324, 326 provide a visual indication when either the home position or a limit of travel has been reached in response to stepper motor energization.

Figure 9:
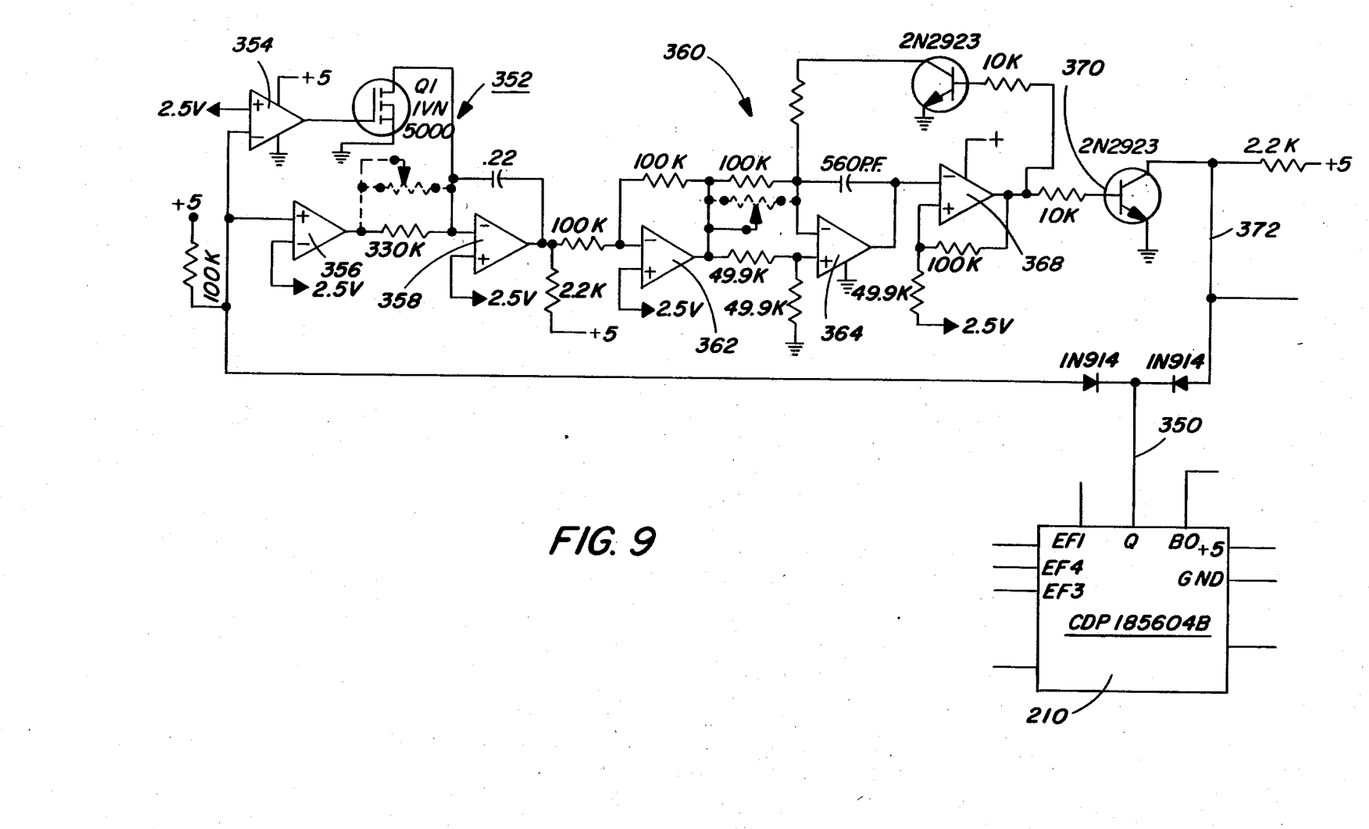

The circuit portion shown in FIG. 9 is responsible for generating control signals for energizing the stepper motor 116. This circuit portion is seen coupled to the controller 210 by a single output 350 whose status controls the stepper motor energization. A high signal of plus 5 volts at this output 350 causes the stepper motor to be energized and a low output stops the stepper motor. The direction of stepper motor movement is controlled by output pin B0 which will be discussed in conjunction with FIG. 10.

The output 350 is coupled to a ramp generator 352 including three operational amplifiers 354, 356, 358. An output from the third amplifier 358 ramps from a starting voltage of 0 volts to a maximum of 5 volts in response to a high output from the controller 210. The ramp voltage is coupled to a voltage to frequency converter 360 also including three operational amplifiers 362, 354, 368. The converter 360 converts the voltage from the amplifier 358 into an output whose frequency depends on the size of the ramp signal. This signal is in turn coupled to a transistor switch 370 which produces a square wave output in response to the frequency input. By successively turning this switch 370 on and off, the output from the frequency generator 360 causes an output 372 coupled to the stepper motor input to change from +5 to 0 volts at a rate dependent upon the ramp voltage.

This ramping procedure is necessary due to an inertia of the stepper motor 116. If instead of employing the ramping technique, a high frequency signal were used to start the stepper motor, the phasing of the motor would become out of synchronization and motion would not occur.

Figure 10:
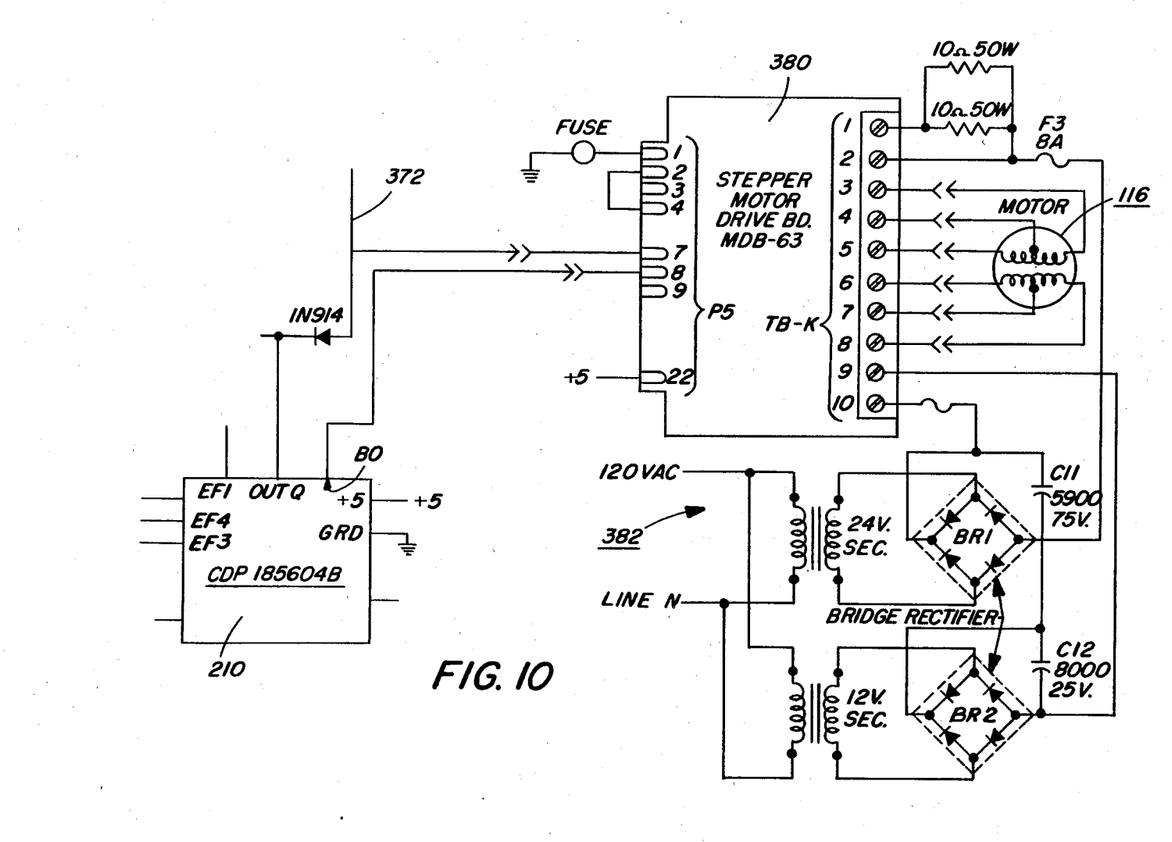

The square wave signals from the circuitry shown in FIG. 9 are coupled to a stepper motor controller board 380 (FIG. 10) for energizing the stepper motor 116. The preferred board 380 is purchased from Advanced Control System Corporation, 24 Teed Drive, Randolph, Mass. 02368. A preferred stepper motor 116 is commercially available and is purchased from Superior Electric of Cleveland, Ohio under designation MO-63. The particular stepper motor chosen produces one rotation of its output shaft 134 in response to 400 steps of the stepper motor. This one rotation in turn produces approximately one half inch of up and down movement of the mandrel. Also shown in FIG. 10 is a power circuit 382 for the motor 116 which is also coupled to the controller board 318. As mentioned above, output pin BO of the controller 210 determines which direction the pulse appearing at the input 372 drives the motor.

OPERATION

Figure 11:
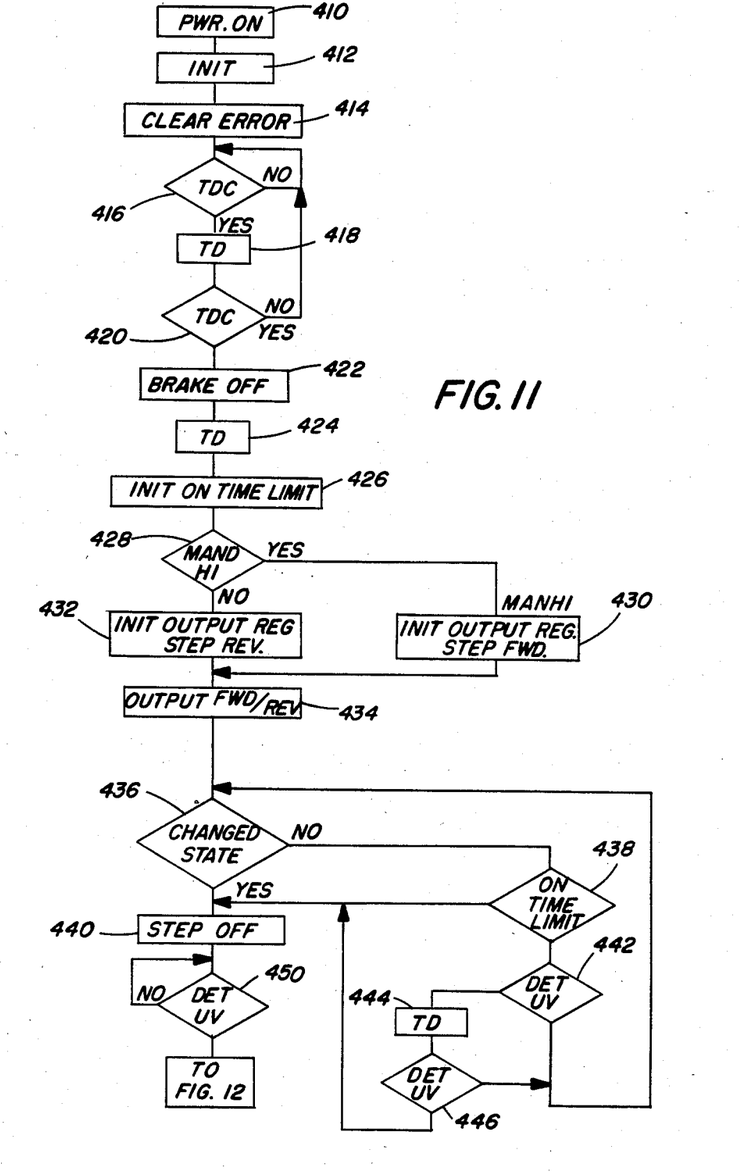
FIGS. 11 and 12 disclose a flow chart summarizing an algorithm performed by a micro-processor shown in FIGS. 7-10 for implementing the control process and apparatus of the invention.
Figure 12:
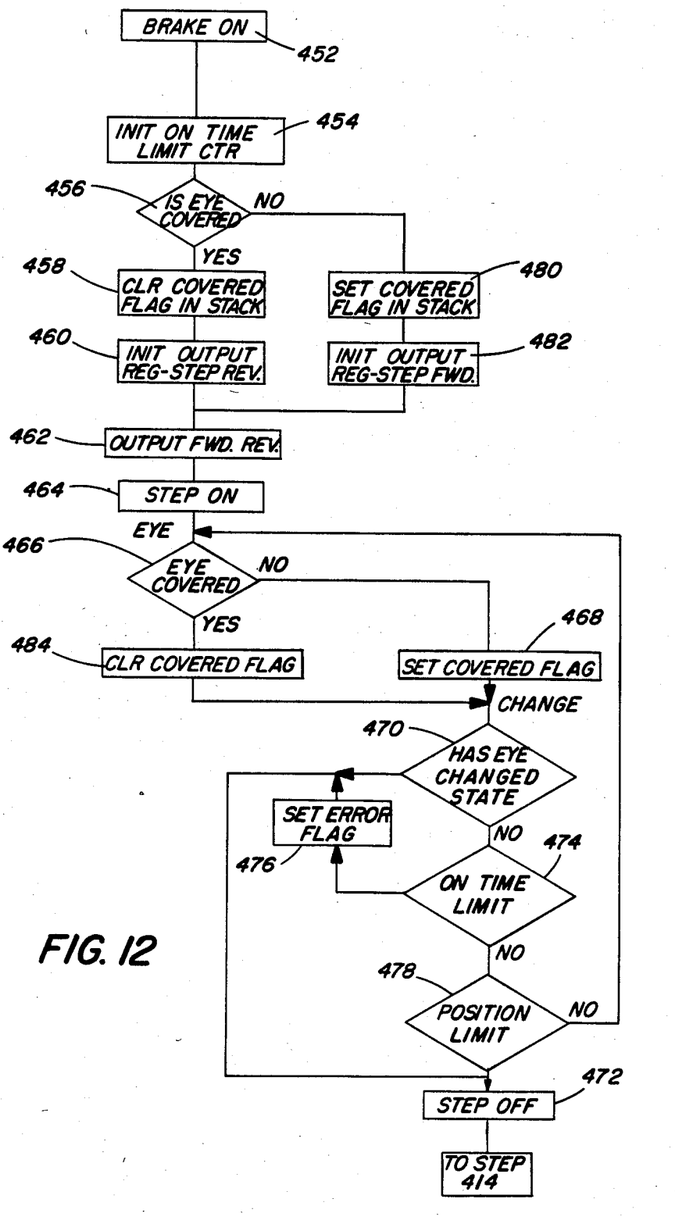

The operation of the circuits described in FIGS. 6–10 and their effect on the movement of the mandrel as well as the brake will be described in conjunction with the flow charts representing the controller algorithm which are depicted in FIGS. 11 and 12.

At the top of FIG. 11 the power on 410 and initialization 412 steps indicate turning on of the system via the switch 218. The initialization steps 412 clear various registers and get the processor 210 ready for the remaining procedures. The particular micro-processor chosen is an RCA 1802 which is chosen because it is inexpensive, has high noise immunity, and consumes low amounts of power.

At step 414 of the algorithm, an error flag is cleared which may become set later if error in labeling operation is sensed. At a decision step 416 a test is made to determine whether the enable signal (FIG. 7) has been received at input pin B2. If it has, a time delay 418 of 100 micro-seconds is instituted and a second check 420 for the enable is made. If the enable is not present, the initial sensing of enable was in error and the sensing returns to the first step.

At the top of gripper assembly movement, the brakes for holding the sleeve must be released so if two successive two top dead center signals are received, the brakes are released 422 and a time delay instituted 424. The output from the brake pin B1 on the controller 210 turns off the transistor 258 which in turn deactivates the brake mechanism.

The next series of steps home the mandrel position or at least attempt to home the mandrel position to a center position so that a maximum amount of both up and down mandrel movement is available after the end label is severed from the chain. As a first step 426 a timer is initialized. This time period is the amount of time the system has to get the carriage 120 to a homed position. At the next step 428 pin B1 of the controller 210 is tested to determine on which side of the home position the mandrel is located. If this pin is high, a mandrel high energization branch is chosen to cause the stepper motor to be energized 430 in a forward direction. If the pin is low, however, the stepper motor is energized in a reverse direction 432.

At the step 434 labeled output forward/reverse, the stepper motor is energized and the micro-processor checks pin to determine 436 whether a change in state has occurred. If no change of state occurs, the microprocessor branches to determine 438 whether the time limit set at step 426 has been reached. If it has, the micro-processor branches back and turns off 440 the stepper motor. If the timing limit has not been reached, the controller branches to a decision step 442 labeled detector UV which is a check to determine whether the detector 60 has seen a web mark. If it has not, it returns to step 436 to determine whether the signal from the Hall effect device has changed states and the testing continues. If an output 242 from the detector 60 is observed, a small time delay is instituted 444 and again the output is checked 446. If the signal is a valid signal, the detector output should still remain positive and the homing algorithm must stop (step 440). If the signal was a spurious one due to noise or the like, the homing procedure continues.

Once the stepper motor is turned off 440 (for whatever reason) a next algorithm step 450 determines whether the detector 60 is viewing a web mark. Naturally, if the step off decision 440 is reached due to the sensing by this detector, the yes branch of this decision step 450 will be followed, if not, the controller 210 loops back and makes the same test. Eventually, the detector 60 will generate a signal at which point the brake signal is activated (FIG. 12). This "brake on" step 452 causes the transistor 258 to turn on and fire the brakes to disconnect the last label. The controller signal at pin B1 stays high after the one shot transistor 258 turns off until the enable signal is sensed at the beginning of the routine and the brake pin B1 goes low.

Once the brake has been activated, the controller 210 begins adjusting the position of the bottom of the next sleeve so that sleeve will be properly positioned on a bottle. First, a timer limit is set 454 or initialized and then a test is undertaken to determine whether the detector 110 senses the next sleeve. This step 456 is designated "is eye covered" in FIG. 12. If the fiber optic eye is covered, the algorithm branches is to a step 458 where a flag is cleared and then the stepper motor is driven in reverse 460, 462, 464. This direction of energization of the stepper motor will move the fiber optic input to the detector 110 until it becomes uncovered, i.e., the mandrel is raised a sufficient amount.

Another decision branch 466 is encountered in which a test to determine whether the eye remains covered. If stepper motor energization has uncovered the eye, the decision step 466 branches to the right and the flag which was cleared earlier (step 458) is set 468. A test is then made 470 to determine whether this flag has changed state. If it has, the label has been properly positioned and the algorithm branches to a step 472 where the stepper motor is turned off and the controller 210 branches back to step 414.

If no change of state has yet occurred at step 470 the controller 210 determines 474 whether the time limit set at step 454 has been reached. If the time limit has not passed, a test is made 478 to determine whether the end of travel has been reached by sensing the input from the Hall effect transducer. If the limit has been reached, movement must stop and the algorithm returns to the beginning. If the limit of travel has not been reached, the algorithm again returns to the test 470 to see if the sensor input remains covered. The testing continues and eventually, either the change in the state occurs, the timer times out, or the limit in movement is reached. All three of these conditions cause the stepper motor to be turned off and a return to the beginning of the algorithm.

Of these three conditions, only a yes indication at step 470 is optimum. This branch from decision step 470 means the eye has changed state and the interface between the mandrel and label is positioned next to the sensor 110.

A yes decision at step 478 is an indication that before the sensor eye changed state the stepper motor end of travel was reached. The motor 116 was driven from its home or center position to a limit without sensing the label/mandrel interface. Although the next label may be slightly mis-positioned, labeling continues and hopefully the homing or centering performed at steps 428, 430, 432, 434 allow subsequent labels to be exactly positioned.

A "yes" decision at step 474 is the worst eventuality of the three alignment results. This result means the stepper motor has neither moved the label/mandrel interface opposite the eye or reached an end of travel. The error flag is set, the user apprised at the control panel and the stepper motor 116 deactivated. The user must then stop further labeling and assess the source of the problem. Without user intervention, however, the controller 210 continues to perform the algorithm and awaits the next enable signal at step 416.

Returning to step 456, if the eye is not covered when this step is reached the algorithm branches to the right where the an indicator flag is set 480 and the stepper motor 116 is driven forward 482, 462, 464. At step 466 a check is made to see if the eye is covered. Driving the motor forward will eventually cover the eye and cause the flag set at step 480 to be cleared 484. This change of state is sensed at step 470 and the stepper motor 116 deenergized. Again, if the motor is unable to uncover the eye, the step 470 branches to see if the timer has timed out or the end of travel unit reached.

In summary, the controller performs three functions. At the enable signal the controller 210 homes the mandrel. When the invisible mark on the web is encountered or sensed by the sensor 60 the brake is activated. Finally as the gripper is affixing the severed label the mandrel position is adjusted to achieve an optimum distance between the bottom of the next stretched label and the desired bottom position of that label about its container. This positioning is performed in response to a monitoring of the severing step which defines the position of the mandrel/label interface.

While the present invention has been described with particularity, it should be understood that modifications and alterations may be made therein without departing from the spirit or scope of the invention set forth in the appended claims.

We claim:

1. A process where one or more operations are repetitively performed on a connected series of like objects, said process inlcuding the steps of:
    moving said objects in turn to a first work station and separating a first of said objects from the series;
    monitoring the separation of said first object in anticipation of performing said one or more operations;
    moving said first object along a path of travel based upon said monitoring step to a second work station; and
    performing said one or more operations on said object.

2. The process of claim 1 wherein said series of objects comprises a chain of separable labels and after the step of separating a given label from its predecessor the label is applied to a bottle or can at the second work station.

3. The process of claim 1 wherein said series of objects comprises a series of sleeve labels to be slipped over bottles or cans and subsequent to said step of separating a label from the series said label is moved along the path and applied to said bottle or can.

4. The process of claim 1 additionally comprising the step of optically sensing the arrival of said object at said first work station.

5. In a machine for automatically placing a series of sleeve labels over a series of bottles or cans, said machine having a mandrel for stretching said labels to a shape to be slipped over said bottles or cans and a gripper for gripping in turn each of said stretched labels and moving each said sleeve to a bottling station where said sleeve is slipped over a bottle or can, apparatus for insuring said gripper accurately positions said sleeve over said can or bottle comprising:
    means for raising and lowering said mandrel;
    means for sensing the relative position of said stretched sleeve with respect to said bottling station; and
    control means to raise or lower said mandrel and a stretched label prior to actuation of said gripper to reposition said stretched label before said gripper grasps said label and moves it to said bottling station and affixes said label over said can or bottle.

6. The apparatus of claim 5 additionally comprising an optical sensor for sensing movement of said series of labels by said grippers and a brake activated by said optical sensor for separating one label from said series as said one label is slipped over said can or bottle, said brake activation exposing an interface between said mandrel and a next sleeve for said means for sensing to use as a detection point in determining the position of said stretched sleeve relative to said bottling station.

7. The apparatus of claim 6 where the control means comprises circuitry responsive to both said means for sensing and said optical sensor for activating said gripper, brake, and means for raising and lowering said mandrel.

8. The apparatus of claim 7 wherein said means for raising and lowering comprises a stepper motor having an output shaft coupled to a frame which supports said mandrel and said means for sensing includes an input to apprise said control means said motor shaft has moved to an end of travel position.

9. A process for applying labels to bottles or cans by successively positioning each of a plurality of said bottles or cans at a work station; and applying a sleeve label to each said bottle or can, comprising the steps of:
    (a) spreading the end of one of a chain of interconnected label sleeves and placing a first label in a clamp station;
    (b) grasping the spread sleeve end with a pair of driven clamps;
    (c) moving the clamps toward the work station to move the end sleeve toward the work station while concurrently spreading the next sleeve in the chain over a mandrel;
    (d) sensing the arrival of the next sleeve at the clamp station and thereupon braking the next sleeve of the chain so that continued clamp movement causes said end sleeve to separate from the next sleeve;
    (e) continuing the clamp movement toward the work station until the end sleeve has been pulled over the bottle to a desired extent and then releasing the clamp grasp to leave the end sleeve on the positioned bottle or cans in a desired orientation;
    (f) returning the clamps to the clamp station; and
    (g) during said continuing clamp movement after end sleeve separation, moving said mandrel to adjust the position said clamps grasp the next label sleeve in said chain.

10. In a bottle label machine having a guide mechanism establishing a path of bottle travel to a work station; an apertured bottle support along the path of travel and at the work station; and means for moving bottles sequentially onto the path and advancing a row of bottles along the path a distance during each cycle equal to a whole integer multiple of a diameter of one of the bottles being pushed; a labeling assembly supported in spaced relationship with the work station comprising:
- (a) a label supply for providing a web of interconnected tubular labels to be fed along a label supply path to a clamp station;
- (b) a mandrel along the label path and including surfaces adapted to open each label as labels are successively moved along the label path;
- (c) a movable label applying mechanism including spaced movable clamps and a clamp drive;
- (d) the label applying mechanism including spaced cams positioned to coact with the clamps and effect clamp and clamp jaw movement as the clamps are moved to clamp a label positioned at the clamp station when the clamps are at or near an extreme of their movement; move the clamps away from one another and stretch a clamped label as the clamps move toward the work station; open the clamps to release a label when such label has been positioned on a bottle; and move the clamps toward one another to position one jaw of each clamp to pass into and the other jaw of each clamp to be outside of another label as the clamps move toward the clamp station;
- (e) a detector for sensing the presence of a second label at the clamp station as an end label of a web is pulled along the label path by the clamps and to emit a signal in response to such sensing;
- (f) brake means connected to the detector for braking a web each time the detector emits a signal in response to such sensing; and
- (g) mandrel adjusting means for repositioning said mandrel and said second label as said clamps move toward the work station subsequent to actuation of said brake means.

11. Apparatus for repetitively performing one or more operations on a series of like objects comprising:
   means for moving said objects along a travel path to one or more work stations where said one or more operations are to be performed;
   means for separating an endmost object from the series;
   monitor means for monitoring the separation of said endmost object in anticipation of an operation;
   controlling means for controlling movement of said object to the one or more work stations based upon said monitoring step; and
   means for performing said one or more operations on said endmost object.

12. The apparatus of claim 11 where the objects comprise a series of sleeve labels and the means for moving comprise gripper means for engaging an endmost label and pulling the endmost label over a bottle or can.

13. The apparatus of claim 12 additionally comprising a mandrel spaced along the path to stretch the endmost label before the gripper means engage the endmost label and where the means for separating comprises a brake that pins a subsequent sleeve in the series against the mandrel while the gripper means tears the endmost label from the series.

14. The apparatus of claim 11 where the monitor means comprises an optical sensor for sensing the position of an endmost label prior to separation of the endmost label from the series and the controlling means comprises means for adjusting the path of object travel to the one or more work stations after the endmost label is separated from the series.

15. Apparatus for repetitively applying a series of connected sleeve labels about a plurality of containers comprising:
   gripper means for gripping and moving an endmost label along a travel path to a labeling work station;
   stretching means for stretching said endmost label into a configuration for application to a container;
   separation means for pinning a subsequent label against the stretching means as the gripper means moves the endmost label over a container;
   monitoring means for monitoring separation of the endmost label from the subsequent label; and
   control means responsive to the monitoring means to adjust the travel path to the labeling work station.

16. The apparatus of claim 15 where the control means controls adjustment of a position of the endmost label prior to separation.

17. The apparatus of claim 16 wherein the adjustment is accomplished by a motor that moves the stretching means relative the labeling station prior to actuation of the gripper means.

18. The apparatus of claim 17 where the control means controls timing of the gripping, separating and monitoring of the labeling applying apparatus.

19. A machine for automatically placing a series of sleeve labels over a series of bottles or cans comprising:
   a mandrel for stretching said labels to a shape to be slipped over said bottles or cans and a gripper for gripping in turn each of said stretched labels and moving each said sleeve to a bottling station where said sleeve is slipped over a bottle or can;
   positioning means for raising and lower said mandrel;
   sensing means for sensing the relative position of said stretched sleeve with respect to said bottling station; and
   control means to raise or lower said mandrel and a stretched label prior to actuation of said gripper to reposition said stretched label before said gripper grasps said label and moves it to said bottling station and affixes said label over said can or bottle.

20. The apparatus of claim 19 additionally comprising an optical sensor for sensing movement of said series of labels by said grippers and a brake activated by said optical sensor for separating one label from said series as said one label is slipped over said can or bottle, said brake activation exposing an interface between said mandrel and a next sleeve for said sensing means to use as a detection point in determining the position of said stretched sleeve relative to said bottling station.

21. The apparatus of claim 20 where the control means comprises circuitry responsive to both said sensing means and said optical sensor for activating said gripper, brake and means for raising and lowering said mandrel.

22. The apparatus of claim 21 wherein said positioning means comprises a stepper motor having an output shaft coupled to a frame which supports said mandrel and said sensing means includes an input to apprise said control means said motor shaft has moved to an end of travel position.

23. A bottle label machine comprising:
- (a) a guide mechanism establishing a path of bottle travel to a work station;
- (b) an apertured bottle support along the path of travel and at the work station;

(c) drive means for moving bottles sequentially onto the path and advancing a row of bottles sequentially onto the path and advancing a row of bottles along the path a distance during each cycle equal to a whole integer multiple of a diameter of one of the bottles being pushed; and
(d) a labeling assembly supported in spaced relationship with the work station,
said labeling assembly including:
  (i) a label supply for providing a web of interconnected tubular labels to be fed along a label supply path to a clamp station;
  (ii) a mandrel along the label path and including surfaces adapted to open each label as labels are successively moved along the label path;
  (iii) a movable label applying mechanism including spaced movable clamps and a clamp drive;
  (iv) the label applying mechanism including spaced cams positioned to co-act with the clamps and effect clamp and clamp jaw movement as the clamps are moved to clamp a label positioned at the clamp station when the clamps are at or near an extreme of their movement; move the clamps away from one another and stretch a clamped label as the clamps move toward the work station; open the clamps to release a label when such label has been positioned on a bottle; and move the clamps toward one another to position one jaw of each clamp to pass into and the other jaw of each clamp to be outside of another label as the clamps move toward the clamp station;
  (v) a detector for sensing the presence of a second label at the clamp station as an end label of a web is pulled along the label path by the clamps and to emit a signal in response to such sensing;
  (vi) brake means connected to the detector for braking a web each time the detector emits a signal in response to such sensing; and
  (vii) mandrel adjusting means for repositioning said mandrel and said second label as said clamps move toward the work station subsequent to actuation of said brake means.

* * * * *